Nov. 15, 1927.

R. E. TETENS 1,649,265

GAS TANK SUPPORT

Filed Dec. 18, 1926

Inventor
Raymond E. Tetens

By Blackmore, Spencer & Hiult
Attorneys

Patented Nov. 15, 1927.

1,649,265

UNITED STATES PATENT OFFICE.

RAYMOND E. TETENS, OF LANSING, MICHIGAN, ASSIGNOR TO GENERAL MOTORS CORPORATION, OF DETROIT, MICHIGAN, A CORPORATION OF DELAWARE.

GAS-TANK SUPPORT.

Application filed December 18, 1926. Serial No. 155,668.

This invention relates to motor vehicles and more particularly to a new and improved arrangement for mounting the fuel tank thereon.

One of the primary objects of the invention is to provide a simple and inexpensive construction, which will be easy to manufacture and assemble, and unlikely to get out of repair.

A further object is to provide a chassis frame member with relatively movable parts to firmly clamp the fuel tank, and which afford comparatively large bearing surface to obviate the danger of cutting into or distorting the tank wall, when the parts are moved into clamping contact therewith.

A still further object of the invention is to provide an improved means for suspending the tank so as to shield it from injury and damage.

Figure 1:
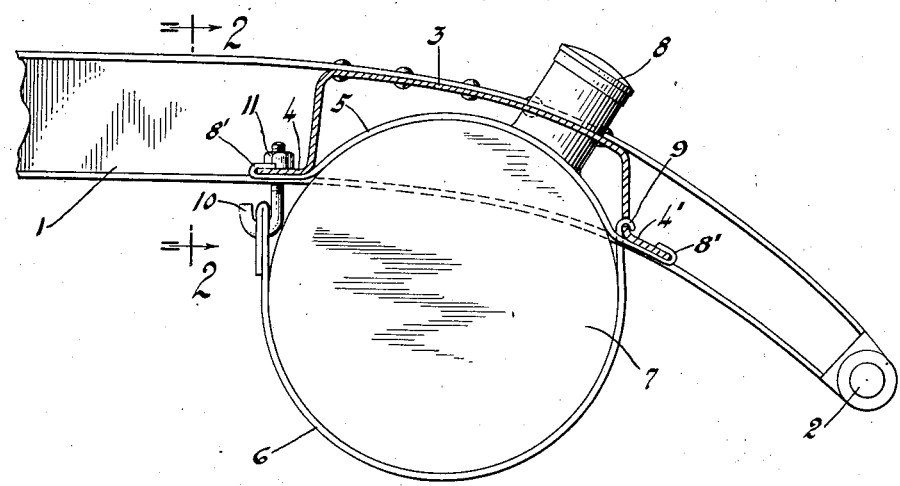
Figure 2:
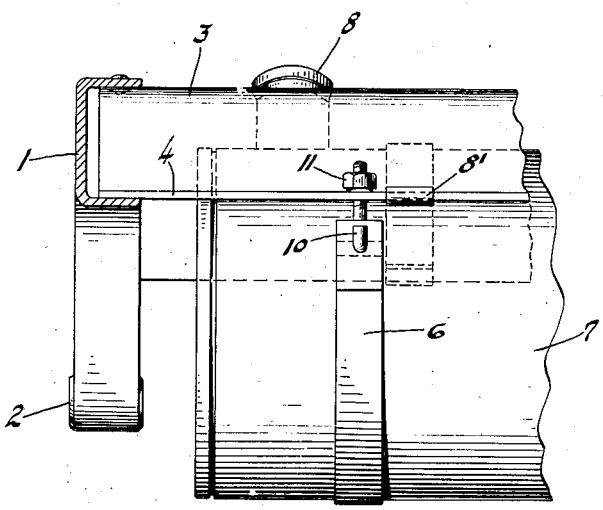

Other objects will be apparent from the following description and the accompanying drawing, wherein:

Figure 1 is a longitudinal sectional view thru the rear portion of an automobile chassis frame, embodying the present invention, and, Figure 2 is a transverse section on line 2—2 of Figure 1.

Referring to the drawing, showing a preferred, but not necessarily the only embodiment of the invention, one of the longitudinally extending side members of a chassis frame is indicated at 1, the rear portion being curved downwardly and terminating in an eye 2, for attachment of a spring shackle. In order to connect the two side members together there is provided a transversely extending channeled or U-shaped member 3, the free ends of which are turned outward to form lateral flanges 4—4'. Relatively movable straps or bands 5 and 6, carried by the frame member 3 and disposed transversely of the channel, serve to suspend or mount a fuel tank 7, having a filler spout 8 extending upwardly thru the frame member 3. The upper strap 5 has an intermediate arcuate portion projecting within the channel of the frame member and its opposite ends are reversely bent as at 8' around the flanges 4—4', and are thus firmly secured thereto. One end of the lower strap 6 is reversely bent to form a hook 9, which extends thru an aperture in the frame member, while the other end is bent back upon itself and provided with an opening or eye, thru which the hook of a draw bolt 10 projects. The threaded stem of the bolt passes thru the lateral flange 4, and an adjustable nut 11 thereon controls the tightening or clamping of the straps about the fuel tank 7. Thus the straps extend substantially entirely around the tank and the clamping strain, due to contraction of the straps, is distributed evenly over a maximum surface thereof. It will be apparent that by locating the arcuate portion of the upper strap 5 within the channel, the tank is partially enclosed by the channeled frame member, and is thus protected from injury.

While the invention has been described more or less specifically, it is to be understood that the invention is not limited to the exact details, but that such modification may be made as comes within the scope of the appended claims.

Having described my invention, I claim:

1. In a motor vehicle, the combination of a channeled chassis frame member, the side flanges of which are out-turned to form lateral marginal flanges, a strap extending transversely of the frame member, having its opposite ends secured to the lateral flanges and its intermediate portion projecting within the channel of the frame member, a second strap having its intermediate portion spaced from the intermediate portion of the first strap, and one end connected to one marginal flange and the opposite end adjustably connected to the other marginal flange, whereby the space between said straps may be varied, and a tank suspended within said channel by said straps.

2. In a motor vehicle, the combination of a channeled chassis frame member, a tank adapted to extend within the channel of the frame member, and means for supending the tank to the frame member, including a strap extending transversely across and within the channel and fixedly secured to the frame member, and a second strap extending transversely of the channel and adjustably secured to the frame member, said straps cooperating with each other to clamp said tank therebetween.

3. In a motor vehicle, the combination of a channeled chassis frame member, having outturned flanges at the open end thereof, a tank adapted to extend within the channel of the frame member, a strap extending transversely of the channel having its opposite ends reversely bent over the marginal flanges and its intermediate portion passing over the upper part of the tank, a second strap passing under the lower part of the tank, having one end projecting thru an aperture in the frame member and reversely bent to form a hook and a draw bolt securing the opposite end of said second strap to the frame member, whereby said tank may be firmly clamped between the upper and lower straps.

In testimony whereof I affix my signature.

RAYMOND E. TETENS.